(12) United States Patent
Wolleschensky

(10) Patent No.: US 7,505,202 B2
(45) Date of Patent: Mar. 17, 2009

(54) OPTICAL SCANNING MICROSCOPE WITH LINE SCANNING

(75) Inventor: Ralf Wolleschensky, Apolda (DE)

(73) Assignee: Carl Zeiss Microimaging GmbH, Jena (DE)

( * ) Notice: Subject to any disclaimer, the term of this patent is extended or adjusted under 35 U.S.C. 154(b) by 0 days.

(21) Appl. No.: 11/808,317

(22) Filed: Jun. 8, 2007

(65) Prior Publication Data
US 2007/0236787 A1 Oct. 11, 2007

Related U.S. Application Data

(62) Division of application No. 10/967,345, filed on Oct. 19, 2004, now Pat. No. 7,388,713.

(30) Foreign Application Priority Data

Jul. 16, 2004 (DE) .................. 10 2004 034 968

(51) Int. Cl.
*G02B 21/06* (2006.01)

(52) U.S. Cl. .................. 359/389; 359/202; 359/204

(58) Field of Classification Search .................. None
See application file for complete search history.

(56) References Cited

U.S. PATENT DOCUMENTS

| | | | |
|---|---|---|---|
| 4,991,953 A | 2/1991 | Pfibsen et al. | |
| 5,243,465 A | 9/1993 | Fein | |
| 6,088,097 A | 7/2000 | Uhl | |
| 6,094,300 A | 7/2000 | Kashima et al. | |
| 6,134,002 A | 10/2000 | Stimson et al. | |
| 6,185,036 B1 | 2/2001 | Tanaami | |
| 7,301,696 B2 * | 11/2007 | Wolleschensky | 359/385 |
| 2002/0020800 A1 | 2/2002 | Knebel et al. | |
| 2003/0142292 A1 | 7/2003 | Wolleschensky et al. | |
| 2004/0031930 A1 | 2/2004 | Wolleschensky et al. | |
| 2004/0032650 A1 | 2/2004 | Lauer | |

FOREIGN PATENT DOCUMENTS

| | | |
|---|---|---|
| DE | 10257237 | 6/2003 |
| JP | 0275529 A | 10/2000 |

\* cited by examiner

*Primary Examiner*—Stephone B. Allen
*Assistant Examiner*—Derek S Chapel
(74) *Attorney, Agent, or Firm*—Jacobson Holman PLLC

(57) ABSTRACT

Optical scanning microscope with line scanning and with illumination of a specimen via a beam splitter, which is arranged in an objective pupil and includes at least a reflecting first portion and at least a transmitting second portion, whereby the reflecting portion serves to couple in the illumination light and the transmitting portion serves to pass the detection light in the detection direction or the transmitting portion serves to couple in the illumination light and the reflecting portion serves to couple out the detection light, with a first scanning arrangement, whereby a mechanism is provided in the detection light path for the overlay of at least one further scanning arrangement for illumination and detection.

2 Claims, 5 Drawing Sheets

OPTICAL SCANNING MICROSCOPE WITH LINE SCANNING

CROSS-REFERENCE TO RELATED APPLICATIONS

The present patent application is a division of application Ser. No. 10/967,345, filed Oct. 19, 2004, now U.S. Pat. No. 7,388,713 which is incorporated herein by reference in its entirety.

BACKGROUND OF THE INVENTION

1. Field of the Invention

The present invention is directed to a microscope, in particular an optical scanning microscope with illumination of a specimen via a beam splitter 2. Related Art In U.S. Pat. No. 6,888,148 among other things a beam splitter is described for a line scanner.

In a line scanner the specimen is illuminated with a line focus (e.g. along the X-coordinate), which is shifted in the coordinate (Y) perpendicular to the line. For this the source of light is linearly focused into an intermediate image plane of the microscope mechanism by means of optics. By the focusing in Y direction in the intermediate image, for example by a cylinder lens, a linear and diffraction-limited distribution of intensity arises along X on the specimen. With further optics the light is focused into the pupil of the microscope arrangement. In the pupil levels of the microscope arrangement a line focus results in each case. The pupil levels and the scanner are conjugate to each other and to the rear focal plane of the microscope arrangement, so that the scanner can induce the linear and diffraction-limited focused distribution of intensity perpendicular to this (Y-coordinate in the specimen). The focusing into the specimen is made by scan optics, the tube lens and the objective. Relay optics produces conjugate pupil levels of the microscope arrangement. Due to the kind of the specimen reciprocal effect e.g. during an excitation for fluorescence or luminescence the light emitted from the specimen is of small spatial coherency. That is each point excited in the specimen radiates essentially independently of the neighboring points as point emitter into all directions in space. The optics, (e.g. a microscope objective) displays the individual point emitters together with the tube lens TL into an intermediate image plane ZB of the microscope mechanism, whereby the pupil P is illuminated homogeneously (broken light path) by wave fronts that are essentially incoherent to each other and of different directions of propagation. In the pupil is the element which separates the excitation light from the detection light.

SUMMARY OF THE INVENTION

The present invention is directed to a microscope, in particular an optical scanning microscope with illumination of a specimen via a beam splitter, which is arranged in an objective pupil and consists of at least a reflecting first portion and at least a transmitting second portion, whereby the reflecting portion serves to couple in the illumination light and the transmitting portion serves to pass the detection light in the detection direction or the transmitting portion serves to couple in the illumination light and the reflecting portion serves to couple out the detection light, with a first scanning arrangement, whereby means are provided in the detection light path for the overlay of at least one further scanning arrangement for illumination and detection.

DETAILED DESCRIPTION OF THE PREFERRED EMBODIMENTS

FIG. 1:

The light of a far field-source of light LQ is focused with suitable optics for the production of an illumination line, for example a cylinder lens ZL, linearly into one level that is conjugate to the pupil P of the microscope objective O, in which there is described a beam splitter ST; in accordance with U.S. Pat. No. 6,888,148, which exhibits a narrow linear transmitter range, over which the line is displayed via transmission optics L1, L2, scan optics SO, tube lens TL and objective O into the specimen PR. A scanner SC is arranged in a pupil P, that moves the line quickly over the specimen in a scan direction perpendicular to the line expansion.

The light (broken) coming from the specimen, is returned by the beam splitter reflecting up to the narrow transmitter range in the direction of detection via a replaceable filter F as well as detection optics PO toward a line detector/slit diaphragm DE1, in front of which a slit diaphragm can be arranged.

Figure 1:
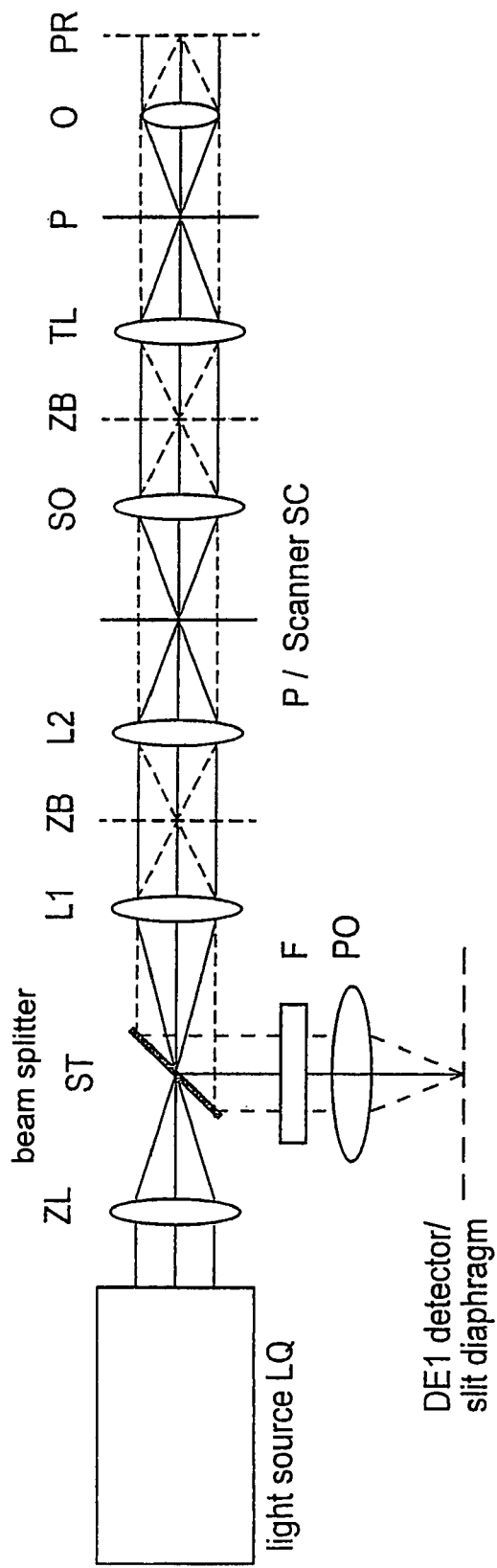
FIG. 1 is a schematic view of a first embodiment of an optical scanning microscope in accordance with the present invention.
Figure 1:
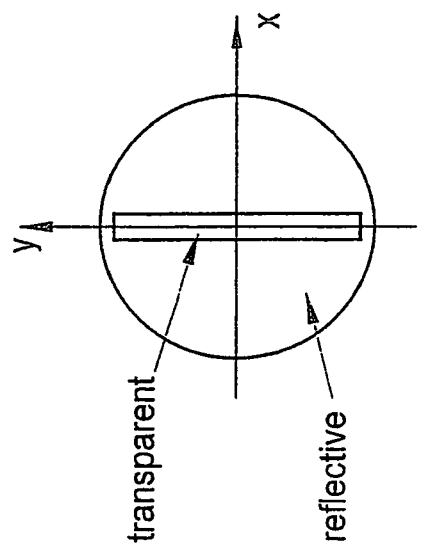

FIG. 2:

Here exemplary sources of light LQ1, LQ2 are represented in addition to the elements represented in FIG. 1 on coupling points, which can result also from bypass of only one source of light, whereby wavelength and intensity can be adjusted advantageously.

By use of achromatic beam splitters, the special advantage is that the same wavelength can be used for both sources of light LQ1, LQ2, which can be formed also by allocation in and of the same source of light. The intermediate images ZB and ZB1 are levels conjugate to each other. Furthermore, the pupil levels of the microscope arrangement P are conjugate levels to each other. The conjugate levels in each case are produced by the effect of the optics lying between them in each case (those acting as relay optics RL1—light paths only schematically drawn).

LQ2 can be for example a point scanner. The illumination light of the point scanner can be used advantageously for the purposeful manipulation (e.g. uncaging) on certain specimen ranges.

The illumination light of LQ2 is faded after passage by separate scan optics SO2 as well as a scanner SC1 (a X/Y scanner favorable) over a usual dichroic color divider FT1 into the detection light path of the line scanner and arrives over the reflective range of the beam splitter ST toward the specimen PR.

C The reflecting range of the beam splitter ST is thus used advantageously for the reflection of a further scan light path.

The light coming from the specimen arrives on the one hand at the line detector/slit diaphragm DE1 via filter F1 and on the other hand depending on interpretation of the color divider FT1 also via a further color divider FT2 toward a point detector/apertured diaphragm DE2 via filter F2.

For example fluorescence light excited by LQ1 coming from the specimen arrives during appropriate interpretation by FT1 on the line detector/slit diaphragm DE1 while reflected light of the point scanner LQ2 arrives on the point detector/apertured diaphragm DE2. Furthermore different fluorescence wavelengths excited also by LQ1 and LQ2 can arrive on the different detectors DE1 and DE2.

Since the light moved by the scanner SC1 is moved here additionally by the scanner SC, the scanner SC1 must be controlled in such a way that it compensates for the movement of the scanner SC and additionally realizes a relative position for line illumination.

That is simple to realize if scanner SC1 moves slower in comparison to the scanner SC.

The fluorescence light induced by LQ2 can be also guided on the line detector DE1.

Depending on the position of the scanner SC2 the fluorescent spot moves away over the line detector/slit diaphragm DE1, i.e. the light is separated by the scanner SC2 toward line detector/slit diaphragm DE1.

FIG. 3

Here a coupling point KS1 is provided, that can be a separate module and is between a microscope stand S with tube lens and objective, a first scan unit SC1 and a second scan unit SC2.

SC1 can contain the described line scanner and SC2 a point scanner for and/or manipulation.

SC1 and SC 2 are couplable with KS1 at interfaces.

For this several intermediate images ZB that are conjugate to each other are available in KS1 (via the optics L1, L2). The conjugate levels in each case are produced by the effect of the optics lying between them (light paths only schematic).

At the beam splitter ST1, which is developed analogous to the beam splitter ST a line is focused on the specimen by the transmitting range. It is attached in one pupil level of the microscope arrangement.

For example with SC1 excited light such as fluorescence light in the specimen is reflected downward at ST1 and arrives over FT3, which is here constructed such that it lets this light portion pass through, as well as over several reflectors RF onto side of ST1. This light is diverted by ST1 toward the detector DE1 via ST.

The fluorescence light excited by the line scanner, which is reflected at ST1 to the side, is thus brought advantageously in the entire width back into the light path toward DE1.

Thus a further scanner SC2 can be reflected via FT3, whereby by appropriate training of FT3, which can be replaceable, different fluorescence wavelengths can arrive at DE1 and/or DE2. The mode of operation is similar to the one described above.

Figure 2:
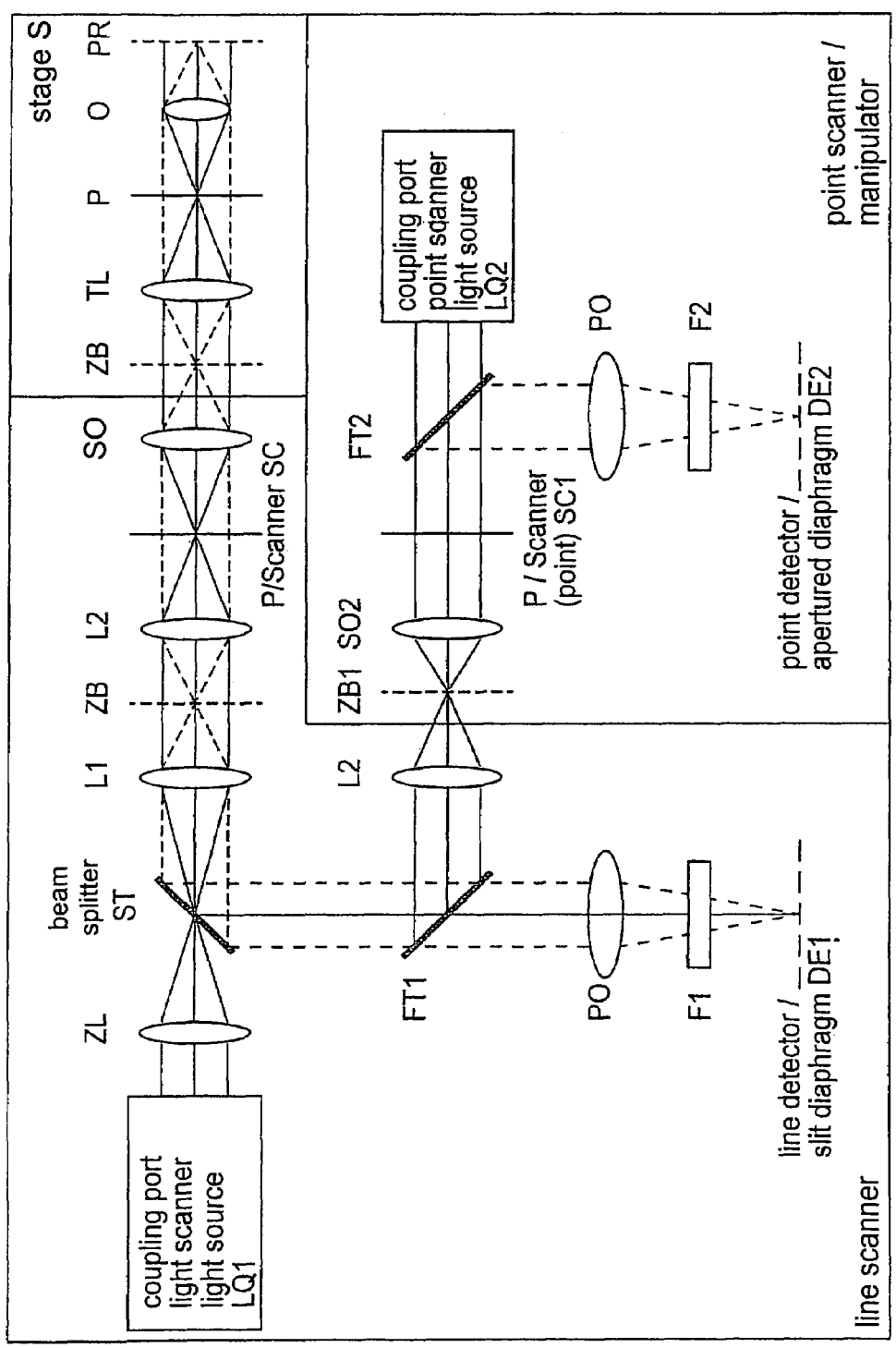
FIG. 2 is a schematic view of a second embodiment of an optical scanning microscope in accordance with the present invention.

Contrary to FIG. 2 the scanners SC1 and SC2 can work here advantageously independent of each other.

Figure 3:
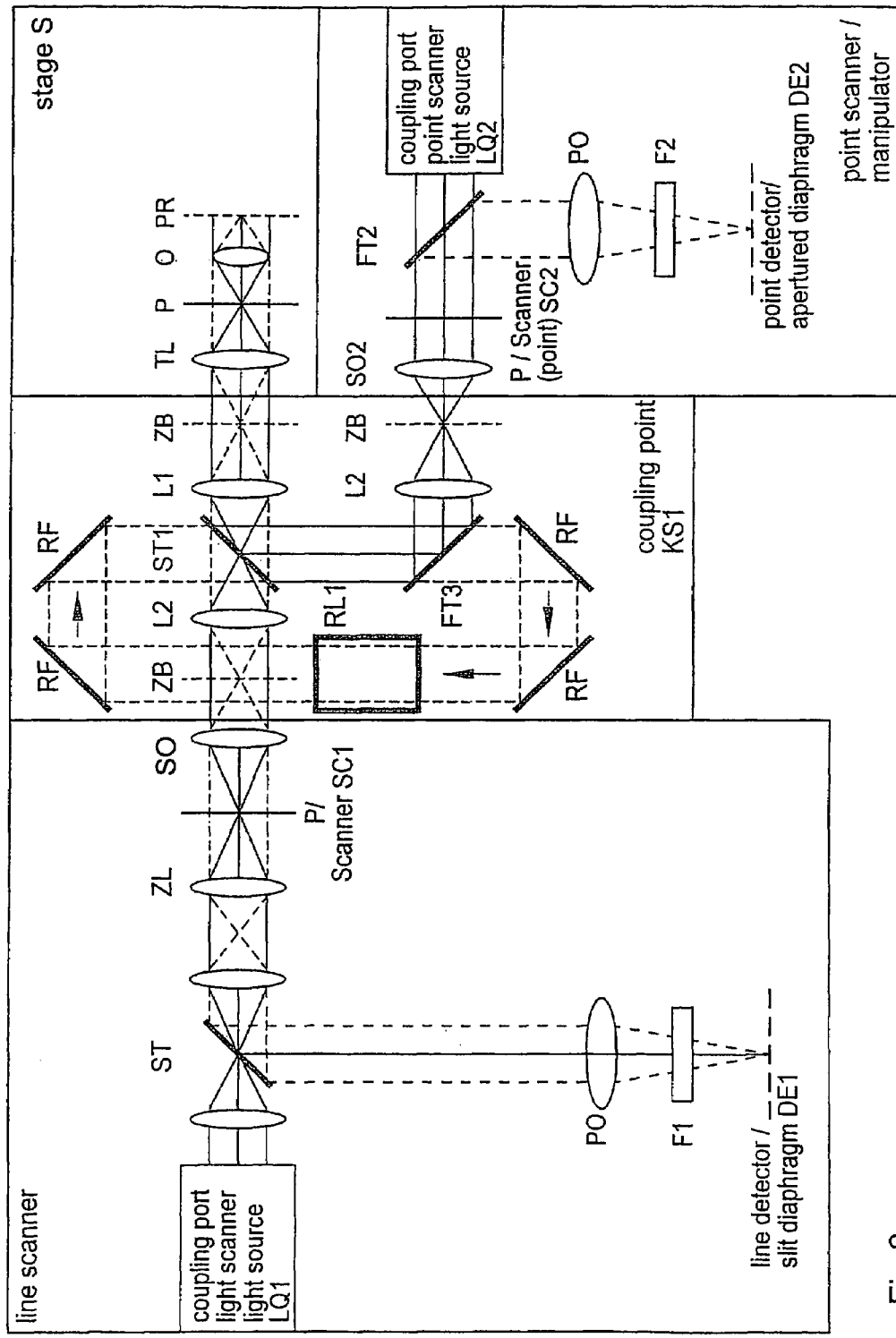
FIG. 3 is a schematic view of a third embodiment of an optical scanning microscope in accordance with the present invention.

FIG. 4:

Here the light is not guided via reflectors RF on the back side of the beam splitter ST1 as in FIG. 3 but on the back side of the scanner SC3, which is here a mirror that can reflect on its front and back sides and further guides with its back side the specimen light (descanned) coming from the specimen and excited by the line scanner (LQ1 arrives from above on the front side of the scanner mirror) to the line detector/slit diaphragm DE1. FT3 is constructed here in such a way that it lets through the light intended for the line detector/slit diaphragm DE1 and only reflects the light intended for the point detector/apertured diaphragm DE2.

Thereby again different fluorescences excited by the line scanner and the point scanner can be detected advantageously at the same time.

Figure 4:
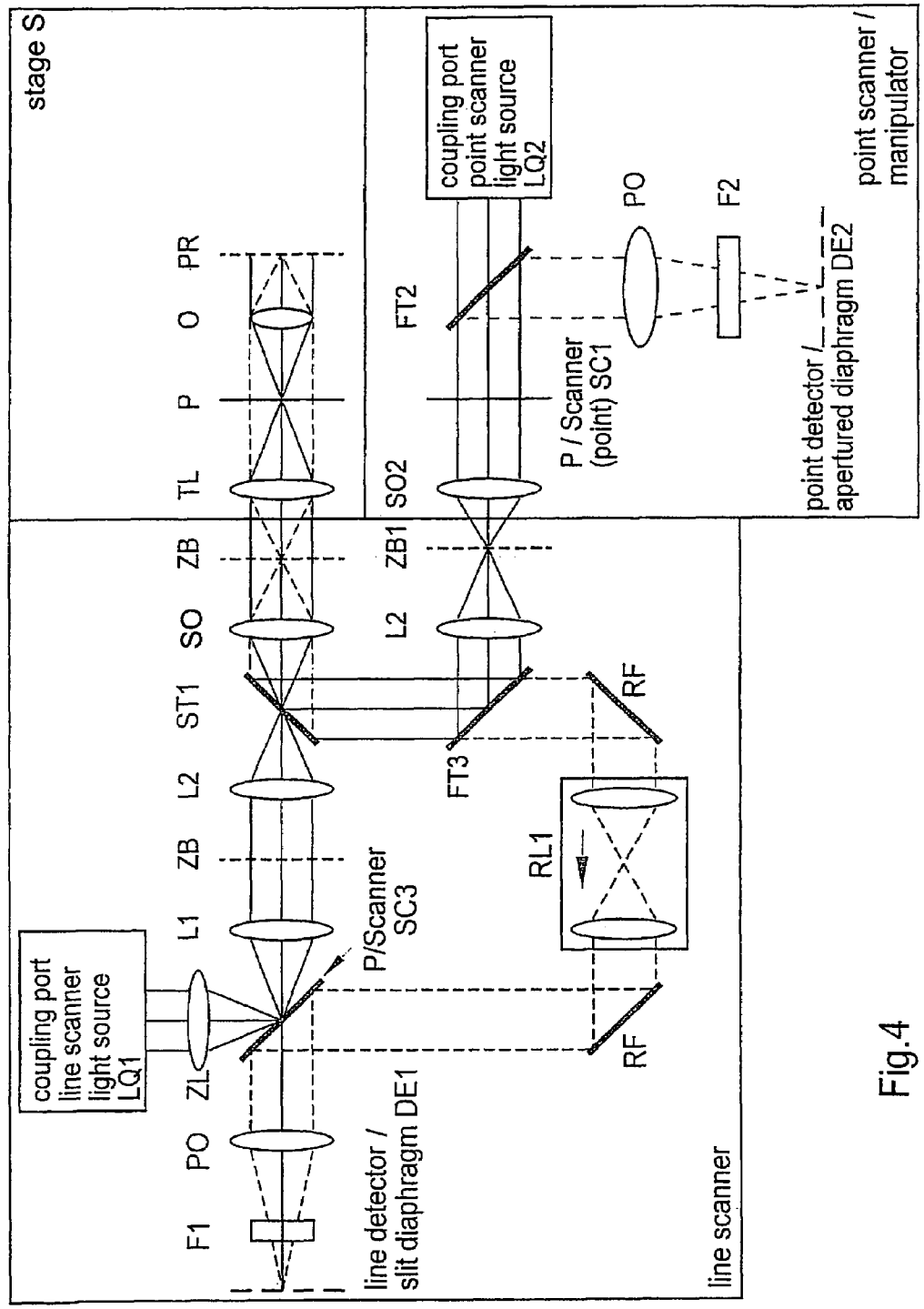
FIG. 4 is a schematic view of a fourth embodiment of an optical scanning microscope in accordance with the present invention.
Figure 5:
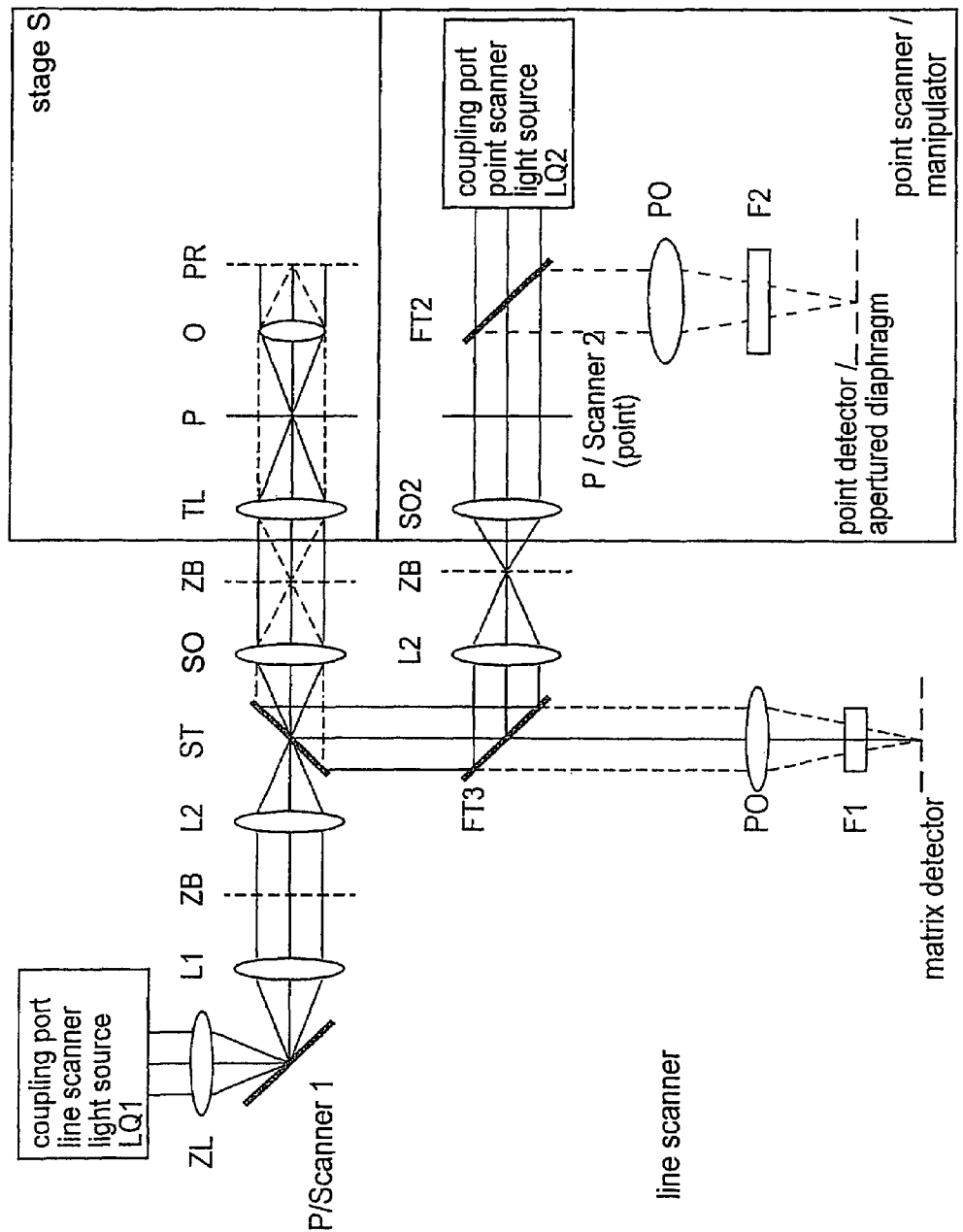
FIG. 5 is a schematic view of a fifth embodiment of an optical scanning microscope in accordance with the present invention.

FIG. 5:

Here the light excited by the line scanner is not descanned as in FIG. 4 but arrives via F1 directly at a surface detector (CCD matrix, gegatete camera), i.e. the linear light distribution coming from the specimen runs in the direction of the scan via the receiver surfaces, which records thereby a specimen image.

Further scan arrangements can also be reflected by cascading (arrangement of further color dividers FT2 and FT3 into a common light path). The scan arrangements can be arbitrary image-giving arrangements. Examples are the already mentioned point scanners, scanners of point of resonance, Nipkow scanner, line scanners and multi-point scanners. Furthermore, these can also be far-field based microscope systems. It is advantageous here that they exhibit an intermediate image plane as interface.

What is claimed is:

1. An optical scanning microscope with line scanning, comprising:
   a source of illumination light,
   an objective pupil,
   a beam splitter for illuminating a specimen with the illumination light, the beam splitter being arranged in the objective pupil and including at least one reflecting first portion and at least one transmitting second portion, wherein one of the first and second portion couples in the illumination light and the other of the first and second portion passes detection light in a detection direction,
   a first scanning arrangement for line scanning over the specimen of the illumination light coupled in by the beam splitter, wherein the first scanning arrangement has at least one scan mirror, the scan mirror having a reflecting rear side, and wherein the optical scanning microscope further comprises returning means for directing at least one part of the specimen light to the reflecting rear side of the scan mirror for return in the detection direction and
   at least one further scanning arrangement.

2. The optical scanning microscope of claim 1, wherein the at least one further scanning arrangement is for illumination and detection, and provided in a detection light path.

* * * * *